United States Patent
Gillon et al.

(10) Patent No.: US 9,792,455 B2
(45) Date of Patent: *Oct. 17, 2017

(54) SENSOR AWARE SECURITY POLICIES WITH EMBEDDED CONTROLLER HARDENED ENFORCEMENT

(71) Applicant: DELL PRODUCTS, L.P., Round Rock, TX (US)

(72) Inventors: James T. Gillon, Round Rock, TX (US); Ricardo L. Martinez, Leander, TX (US); Flaviu Cristian Chis, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,289

(22) Filed: May 5, 2016

(65) Prior Publication Data

US 2016/0246987 A1    Aug. 25, 2016

Related U.S. Application Data

(63) Continuation of application No. 14/685,043, filed on Apr. 13, 2015, now Pat. No. 9,369,495, which is a
(Continued)

(51) Int. Cl.
*H04L 9/00* (2006.01)
*H04L 9/32* (2006.01)
(Continued)

(52) U.S. Cl.
CPC .......... *G06F 21/6218* (2013.01); *G06F 21/00* (2013.01); *G06F 21/31* (2013.01);
(Continued)

(58) Field of Classification Search
CPC ......... H04L 63/08; H04L 63/10; H04L 63/16; H04L 63/20; H04L 63/101; H04L 63/14;
(Continued)

(56) References Cited

U.S. PATENT DOCUMENTS 5,621,889 A    4/1997   Lermuzeau et al.
7,178,166 B1   2/2007   Taylor
(Continued)

*Primary Examiner* — Hosuk Song
(74) *Attorney, Agent, or Firm* — Isidore PLLC

(57) ABSTRACT

An information handling system (IHS) performs security policy enforcement using security policy data maintained in an embedded controller, which operates within a privileged environment. The security policy data identifies security policies established for the IHS. The EC is directly connected to a number of sensors from which the EC receives sensor data and to at least one integrated functional device. The EC determines whether the received sensor data fulfills any trigger condition of a security policy. If the received sensor data does not fulfill any trigger condition of a security policy described by the security policy data, the EC continues to monitor sensors for updated sensor data. However, if the received sensor data fulfills any trigger condition of the security policy, the EC performs a security measure that involves enabling, disabling, or resetting one or more of the at least one integrated functional devices that can be disabled.

20 Claims, 5 Drawing Sheets

Related U.S. Application Data continuation of application No. 13/893,685, filed on May 14, 2013, now Pat. No. 9,038,130.

(51) Int. Cl.
| | |
|---|---|
| *G06F 21/62* | (2013.01) |
| *G06F 21/00* | (2013.01) |
| *G06F 21/55* | (2013.01) |
| *H04L 29/06* | (2006.01) |
| *H04L 29/08* | (2006.01) |
| *G06F 21/31* | (2013.01) |

(52) U.S. Cl.
CPC .......... *G06F 21/554* (2013.01); *H04L 63/205* (2013.01); *H04L 67/10* (2013.01); *G06F 2221/2111* (2013.01)

(58) Field of Classification Search
CPC ............. H04L 63/1408; H04L 63/1416; H04L 63/1425; H04L 63/1441; H04L 63/0263; G06F 21/30; G06F 21/311
USPC ..... 726/1–4, 11–14, 22–25, 27–30; 713/168, 713/176, 193; 380/258
See application file for complete search history.

(56) References Cited

U.S. PATENT DOCUMENTS

| | | | |
|---|---|---|---|
| 7,260,830 | B2 | 8/2007 | Sugimoto |
| 7,308,703 | B2* | 12/2007 | Wright .................... G06F 21/32 380/258 |
| 7,322,044 | B2 | 1/2008 | Hrastar |
| 8,081,237 | B2 | 12/2011 | Ito |
| 8,146,160 | B2* | 3/2012 | Orr .................... H04L 63/0209 713/168 |
| 8,370,936 | B2 | 2/2013 | Zuk |
| 8,413,213 | B2* | 4/2013 | Glickman ........... H04L 63/0428 380/255 |
| 8,635,695 | B2 | 1/2014 | Zuk |
| 8,659,250 | B2 | 2/2014 | Maiocchi et al. |
| 8,732,461 | B2* | 5/2014 | Fujii ...................... G06F 21/32 380/262 |
| 9,038,130 | B2* | 5/2015 | Gillon ..................... G06F 21/00 713/168 |
| 9,369,495 | B2* | 6/2016 | Gillon ..................... G06F 21/00 |
| 2003/0053240 | A1 | 3/2003 | Bruner et al. |
| 2008/0104303 | A1 | 5/2008 | Jeansonne et al. |
| 2012/0309354 | A1 | 12/2012 | Du |
| 2013/0191668 | A1 | 7/2013 | Vichare et al. |

* cited by examiner

SENSOR AWARE SECURITY POLICIES WITH EMBEDDED CONTROLLER HARDENED ENFORCEMENT

RELATED APPLICATION

This application is a continuation of U.S. patent application Ser. No. 14/685,043, filed Apr. 13, 2015, which is a continuation of U.S. patent application Ser. No. 13/893,685, filed May 14, 2013, now U.S. Pat. No. 9,038,130, issued May 19, 2015. Both applications are fully incorporated herein by reference.

BACKGROUND

1. Technical Field

The present disclosure generally relates to information handling systems (IHS) and in particular to security policy enforcement within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems, such as personal computers, support a wide range of environmental sensors that have practical applications for a customer. Most customers are familiar with these sensors through software interfaces or applications that provide some useful functionality based on data gathered from the sensors. Security, specifically endpoint security, is a critical component of a customer enterprise solution and there is an opportunity to provide an enhanced customer experience by combining the capabilities provided by onboard hardware sensors and the fulfillment of common security enforcement needs. However, there are significant security challenges involved in utilizing information provided by the various separate software and hardware components of the information handling system.

BRIEF SUMMARY

Disclosed are a method and an information handling system (IHS) that performs security policy enforcement using security policy data maintained in an embedded controller (EC), which operates within a privileged environment. The security policy data identifies security policies established for the IHS. According to a first aspect, the EC is directly connected to a number of sensors from which the EC receives sensor data. The EC determines whether the received sensor data fulfills any trigger condition of a security policy. If the received sensor data does not fulfill any trigger condition of a security policy described by the security policy data, the EC continues to monitor sensors for updated sensor data. However, if the received sensor data fulfills any trigger condition of the security policy, the EC performs a security measure that is associated with at least one condition of one or more established security policies being satisfied.

According to the described embodiments, the EC is isolated from memory and other hardware components of the information handling system and comprises a secure storage in which is stored policy data corresponding to a policy that is enforceable using information received from at least one sensor from which the embedded controller is able to receive an unalterable stream of input data.

As another aspect of the disclosure, the method includes: securely storing security policy data that identifies one or more security policies established for the IHS; in response to receipt of one or more sensor data from the at least one sensor, comparing the received one or more sensor data to the established security policies; and in response to the received one or more sensor data indicating that a condition of one or more of the established security policies is satisfied, performing via a control signal port a security measure that is associated with the condition of the one or more established security policies being satisfied. In one or more embodiments, performing the security measure further comprises: asserting a specific one of an enable signal, a disable signal and a reset signal of one or more of the at least one integrated device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
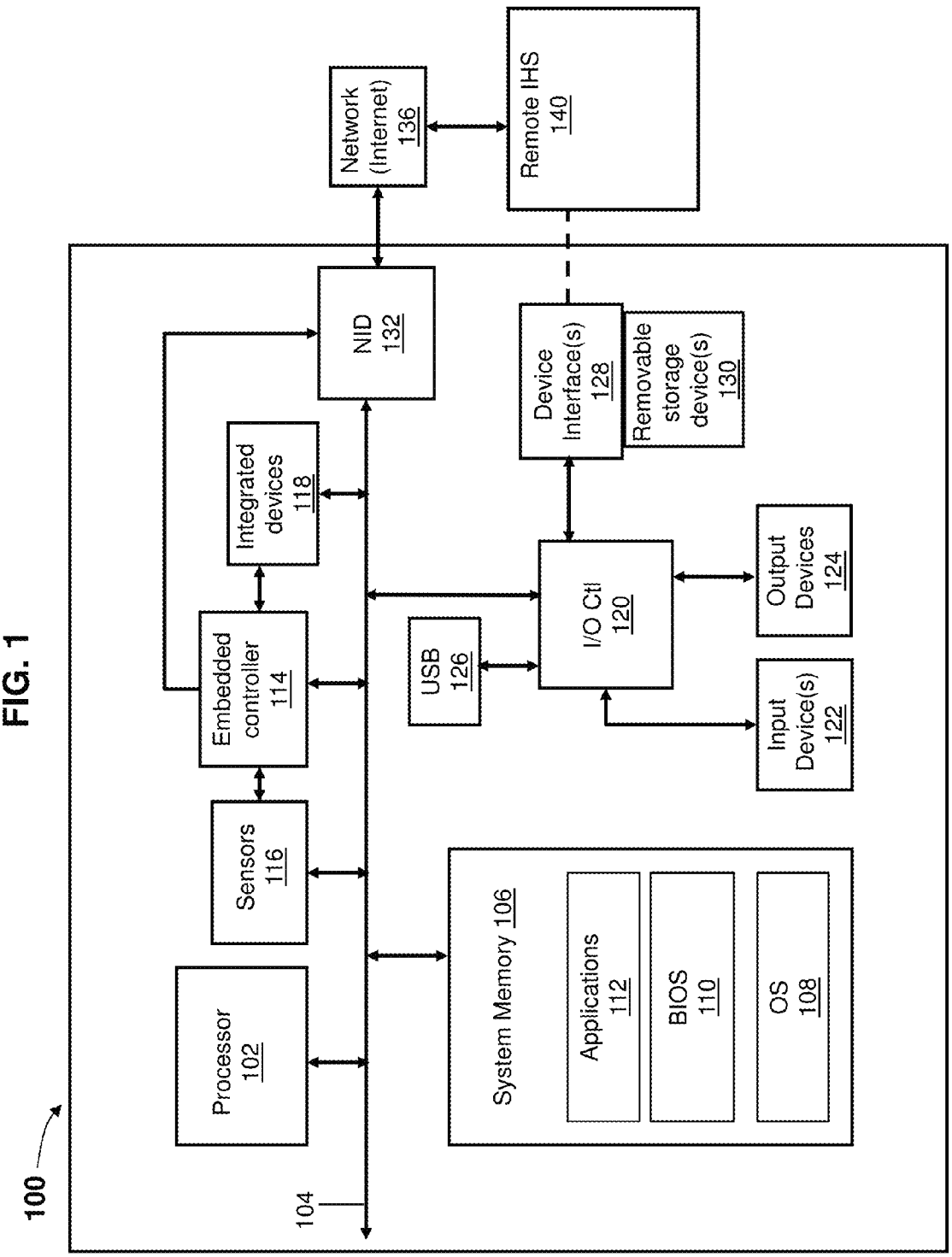
FIG. 1 illustrates an example information handling system (IHS) within which various aspects of the disclosure can be implemented, according to one or more embodiments.

The illustrative embodiments provide a method and an information handling system (IHS) that performs security policy enforcement using security policy data maintained in an embedded controller (EC), which operates within a privileged environment. The security policy data identifies security policies established for the IHS. The EC is directly connected to a number of sensors from which the EC receives sensor data and to at least one integrated functional device. The EC determines whether the received sensor data fulfills any trigger condition of a security policy. If the received sensor data does not fulfill any trigger condition of a security policy described by the security policy data, the EC continues to monitor sensors for updated sensor data. However, if the received sensor data fulfills any trigger condition of the security policy, the EC performs a security measure that involves enabling, disabling, or resetting one or more of the at least one integrated functional device that can be disabled.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. As shown, system memory 106 can include therein a plurality of modules, including operating system (O/S) 108. In addition, system memory 106 includes Basic Input/Output System (BIOS) 110, Applications 112 and firmware (not shown). The various software and/or firmware modules have varying functionality when their corresponding program code is executed by processor(s) 102 or other processing devices within IHS 100.

IHS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as I²C, SMBus, and peripheral component interconnect (PCI) buses.

IHS 100 also comprises embedded controller (EC) 114. In addition, IHS 100 comprises sensors 116 and a number of integrated devices 118 which are both directly coupled to EC 114. As a result of these direct and dedicated connections, EC 114 is able to receive an unalterable stream of input data from sensors 116 and directly transmit control signals to respective control ports of integrated devices 118.

IHS 100 comprises a network interface device (NID) 132. In one embodiment, EC 114 is directly coupled to a control port of NID 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via an external network, such as network 136.

Network 136 can be a local area network, wide area network, personal area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
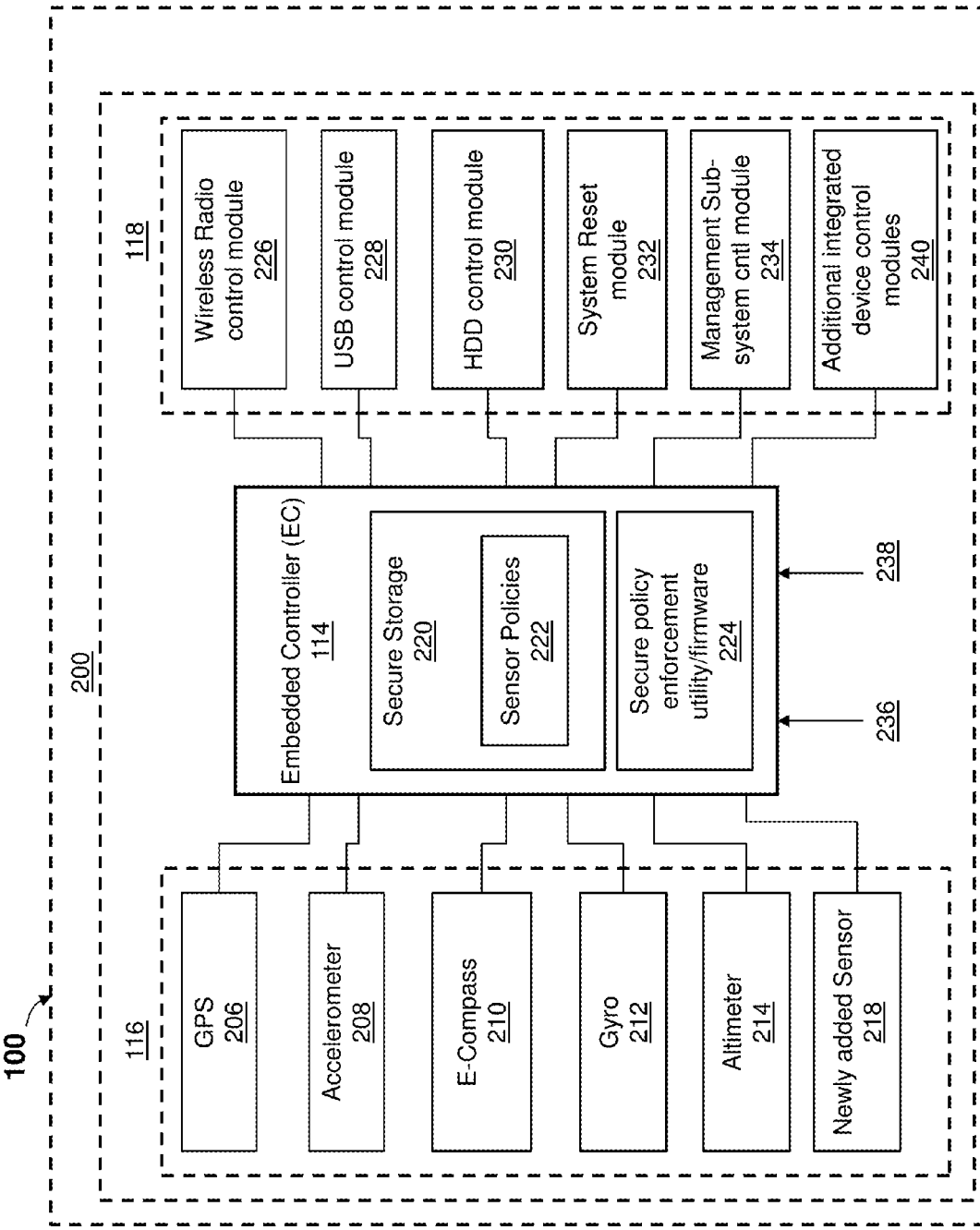
FIG. 2 illustrates another block diagram of the example IHS operating, in accordance with one or more embodiments.

With specific reference now to FIG. 2, there is depicted another block diagram representation of IHS 100, and specifically an exploded view of the embedded controller's secure privileged environment 200, which provides the functional aspects of the described embodiments. As generally illustrated in FIG. 1, the secure privileged environment 200 of IHS 100 comprises embedded controller (EC) 114 directly coupled to a plurality of sensors 116 and integrated functional devices 118. These sensors 116 of IHS 100 can include, as specific examples, without limitation, GPS 206, accelerometer 208, E-Compass 210, Gyro 212 and altimeter 214. As illustrated, each sensor type (206-214) is communicatively coupled to EC 114 via a respective direct hardware/wired connection. The integrated functional devices 118 of IHS 100 can include, as specific examples, without limitation, wireless radio control module 225, USB control module 126, hard disk drive (HDD) control module 230, system reset component 232, and manageability sub-system control module 234. Each of these integrated functional devices 118 includes one or more wired communication ports that can include a reset port, an enable port, and a disable port, among others. As indicated by FIG. 2, EC 114 is communicatively connected, via hardware or wired connection, to select communication ports of specific ones of the integrated functional devices 118. Specifically, EC 114 is shown communicatively connected to a control port of each of wireless radio control module 226, USB control module 228, HDD control module 230, system reset control module 232, and manageability sub-system control module 234. In addition, EC 114 can be configured to enable addition of new or updated security policies. Furthermore, EC 114 can be configured to enable/support a later connection to additional or newly added sensors 218 and newly added integrated device control modules 240 that may be associated or required for supporting enforcement of the new or updated security policies.

In general, EC 114 receives sensor data, determines whether the received sensor data satisfies conditions of a security policy established for IHS 100, and if the received sensor data satisfies conditions of the established security policy, EC 114 targets one or more integrated devices corresponding to the established security policy in order to perform one or more action(s) associated with a security policy enforcement specified by the established security policy.

EC 114 comprises secure storage 220 in which are stored sensor policies 222. In addition, EC 114 includes secure policy enforcement (SPE) utility/firmware 224 which supports the enforcement policy functions of EC 114. Also illustrated in secure, privileged environment of IHS 100 are user input port 236 and manufacturer interface (port) 238. EC 114 can receive or be programmed with initial security policy data during a manufacturing process from a manufacturer, which accesses EC 114 via manufacturer interface (port) 238. EC 114 can be configured to later receive new or updated security policy data from an authenticated user via user input port 236.

According to one aspect of the disclosure, EC 114 operates within a privileged environment (200) that is resistant to computer security attacks and other modifications as a result of an isolation of EC 114 from the rest of the hardware and memory of IHS 100. Since EC 114 is an integral part of the design of IHS 100, EC 114 can also be directly connected (i.e., wired) to input sensors and also tied directly to disable and/or reset signal ports of other integrated functional devices 118. The disable/reset signals allow EC 114 to control the state of these integrated functional devices independently of the operating system and/or other runtime software of IHS 100. Similarly, EC 114 receives an unalterable stream of input data from the sensors 116 as a result of the control that EC 114 has over the system sensors based on the direct connection. In particular, EC 114 receives, from the sensors 116, input data that cannot be changed or "spoofed" by malicious software.

EC 114 securely stores security policy data that identifies one or more security policies established for IHS 100. In particular, EC 114 provides storage of factory and/or user customizable policy data within secure storage 220. As a result of a privileged status associated with the operation of EC 114 within the privileged environment, EC 114 enforces policies defined by the policy data without any further software (or BIOS) intervention. Following receipt and secure storage of policy data, EC 114 is able to independently enforce, using respective output reset/disable signals, specified hardware states to protect customer ports, networks and hard disk drives (HDDs). In addition, IHS 100 can use the policy data to enforce a hardware state specific for IHS 100 by sending a system reset signal directly to a system reset control signal port 232 of IHS 100.

In one embodiment, in order to perform policy enforcement, EC 114 associates a trigger event with pre-defined response actions corresponding to a specific policy provided by the stored security policy data. For example, EC 114 identifies a trigger event as an event that satisfies conditions of a security policy. In different embodiments, the trigger event can be a specific sensor reading or combination of readings from multiple sensors. In response to detecting the occurrence of the at least one trigger event, the EC 114 sends a control signal to a corresponding integrated device to perform a security measure by providing an associated response action corresponding to the specific policy. In one embodiment, EC 114 performs the security measure by asserting a specific one of an enable signal, a disable signal and a reset signal of one or more of the at least one integrated functional devices 118.

As previously described, EC 114 receives sensor data from various sensor devices through direct connections. In response to receipt of one or more sensor data from the at least one sensor 116, EC 114 compares the received one or more sensor data to the established security policies. In response to the received sensor data indicating that the trigger condition(s) of an established security policy is satisfied, EC 114 performs a security measure that is associated with the conditions of the established security policy being satisfied.

Figure 3:
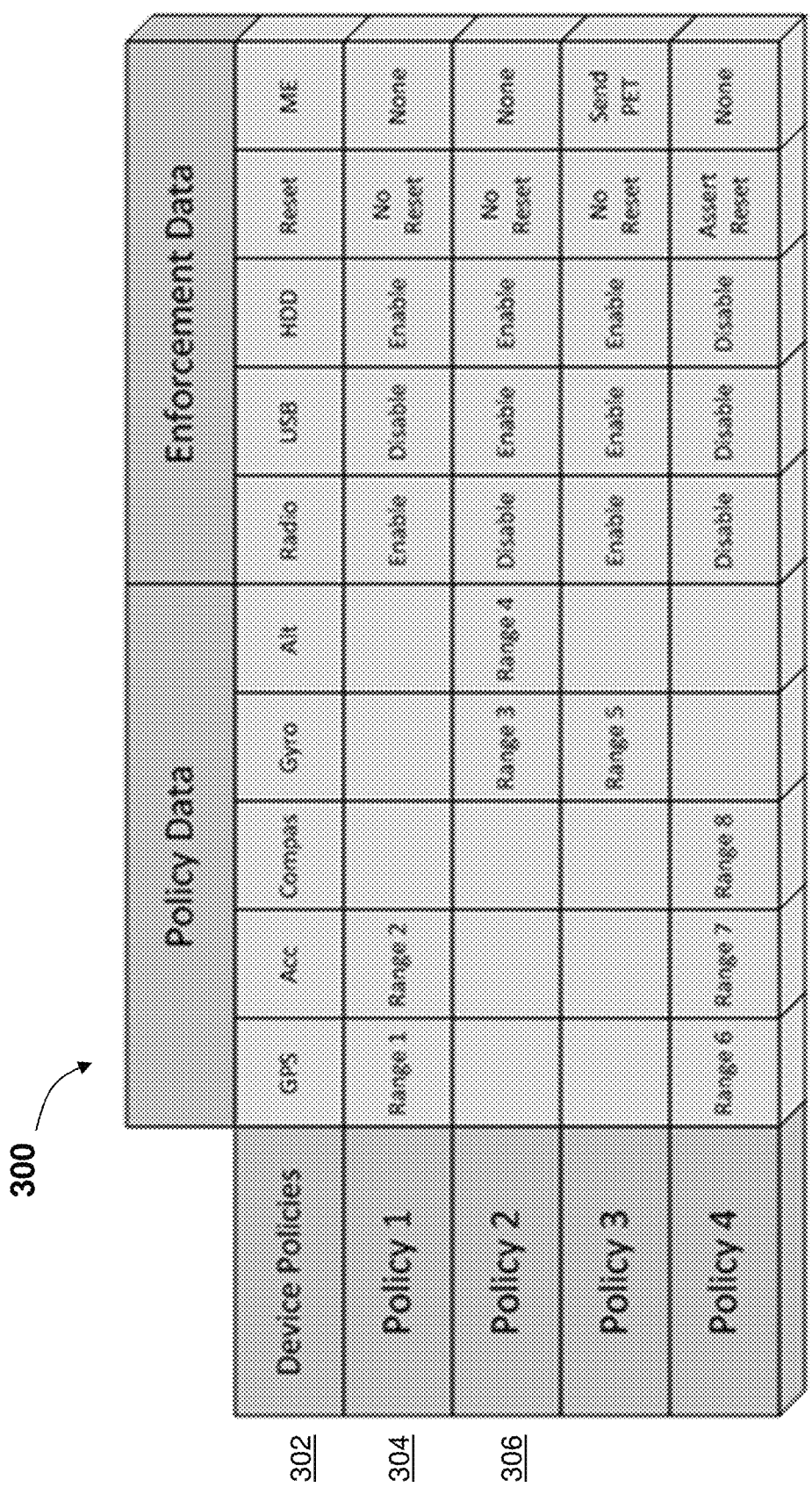
FIG. 3 is a table providing policy with associated enforcement data for an IHS, in accordance with one or more embodiments.

FIG. 3 is a table providing policy and enforcement data for an information handling systems (IHS), according to one embodiment. Table 300 provides policy and enforcement data that is established by at least one of a manufacturer and a user of IHS 100. In one embodiment, table 300 includes and/or represents sensor policies 222 (FIG. 2) that are securely stored in EC 114.

The first column of table 300 provides general identification of various policies associated with specific sensors. Within the second to the sixth columns, policy data corresponding to a respective sensor are provided for each pre-identified policy from among the various policies identified within the first column. For example, policy data corresponding to each of (a) a global positioning system (GPS), (b) an accelerometer, (c) an electronic compass (e-compass), (d) a gyro, and (e) an altimeter, are provided within the second to sixth columns, respectively. Within the seventh to the eleventh columns, enforcement data associated with respective integrated devices are provided for each pre-identified policy from among the various policies identified within the first column. For example, enforcement data corresponding to each of (a) a wireless radio transceiver control port, (b) a universal serial bus (USB) control port, (c) a hard disk drive (HDD) control port, (d) a system reset control port, and (e) a manageability sub-system, are provided within the seventh to the eleventh columns, respectively.

First row 302 of table 300 provides, within the second to the sixth columns, an identification of each of the specific sensors associated with the various sensor policies. In addition, first row 302 provides, within the seventh to the eleventh columns, an identification of each of the specific integrated functional components associated with the various enforcement policies.

Second row 304 of table 300 provides a first sensor policy data and a first enforcement policy data corresponding to "Policy 1". As presented, "Policy 1" indicates that when the conditions of the first sensor policy are satisfied, the corresponding first enforcement policy is enacted. "Policy 1" indicates that the conditions of the first sensor policy are achieved when the GPS indicates that IHS 100 is located at a position within "Range 1", a range of GPS locations, and the accelerometer simultaneously indicates that IHS 100 is undergoing an acceleration that is within "Range 2", a corresponding range of acceleration readings.

Within the seventh to the eleventh columns, "Policy 1" provides the first enforcement policy which respectively specifies the following: (a) EC 114 transmits an enable signal via the wireless radio transceiver control port to enable the wireless radio transceiver; (b) EC 114 transmits a disable signal via the USB control port to disable the USB; (c) EC 114 transmits an enable signal via the HDD control port to enable the HDD; (d) EC 114 does not assert a reset of IHS 100; and (e) EC 114 does not initiate any particular system management procedures via the manageability sub-system.

Third row 306 of table 300 provides a second sensor policy data and a second enforcement policy data corresponding to "Policy 2". As presented, "Policy 2" indicates that when the conditions of the second sensor policy are satisfied, the corresponding second enforcement policy is enacted. "Policy 2" indicates that the conditions of the second sensor policy are achieved when the gyroscope (abbreviated as "gyro"), which tracks rotation or twist, indicates that IHS 100 is undergoing an angular rotational velocity that is measured to be within "Range 3", a range of angular rotational velocities, and the altimeter simultaneously indicates that IHS 100 is located at an altitude that is within a specific altitude range "Range 4".

Within the seventh to the eleventh columns, "Policy 2" provides the second enforcement policy which respectively specifies the following: (a) EC 114 transmits a disable signal via the wireless radio transceiver control port to disable the wireless radio transceiver; (b) EC 114 transmits an enable signal via the USB control port to enable the USB; (c) EC 114 transmits an enable signal via the HDD control port to enable the HDD; (d) EC 114 does not assert a reset of IHS 100; and (e) EC 114 does not initiate any particular system management procedures via the manageability sub-system.

According to one or more aspects of the disclosure, EC 114 controls access to the secure storage and can lock or unlock secure storage 220 (FIG. 2). Once configured during manufacture, EC 114 unlocks secure storage 220 to enable modification of policy data used for policy enforcement in only specific circumstances. According to one or more embodiments, EC 114 enables policy data modification by implementing one or more of: (a) a limited number and/or type of write operations performed on specific policy data (e.g., write-once policies), (b) limited secure access to modify and/or update policy data via manufacturing-only interfaces, and/or (c) secure authenticated user access to modify and/or update policy data following digital signature verification. In one embodiment, EC 114 communicates with BIOS 110 (FIG. 1) using an application programmable interface (API) (e.g., interface 238) to receive policy data provided during the manufacturing process.

Those of ordinary skill in the art will appreciate that the hardware, firmware/software utility, and software components and basic configuration thereof depicted in FIGS. 1 and 2 may vary. The illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

Figure 4:
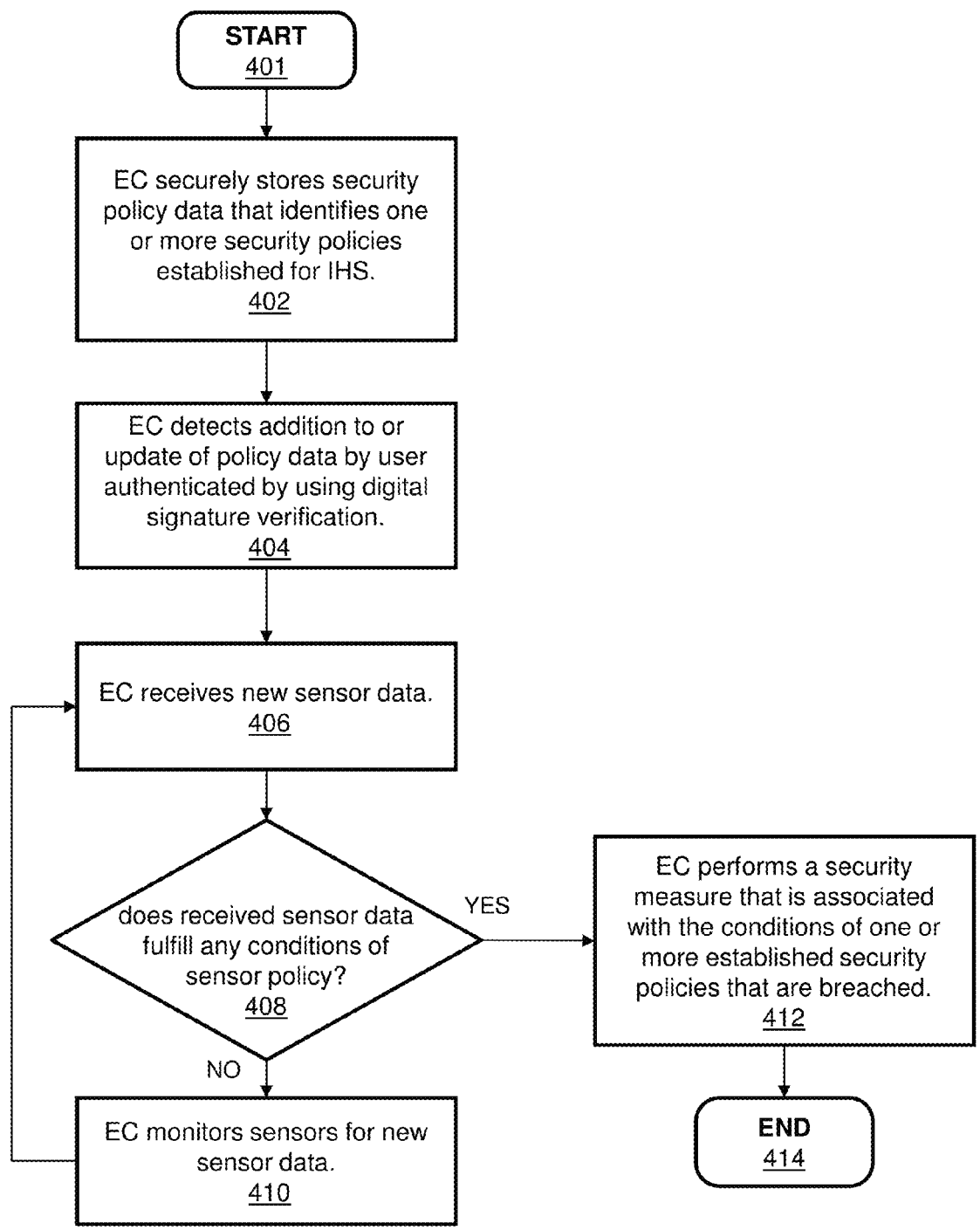
FIG. 4 is a flow chart illustrating a method for providing policy enforcement using secure policy data, in accordance with one or more embodiments.
Figure 5:
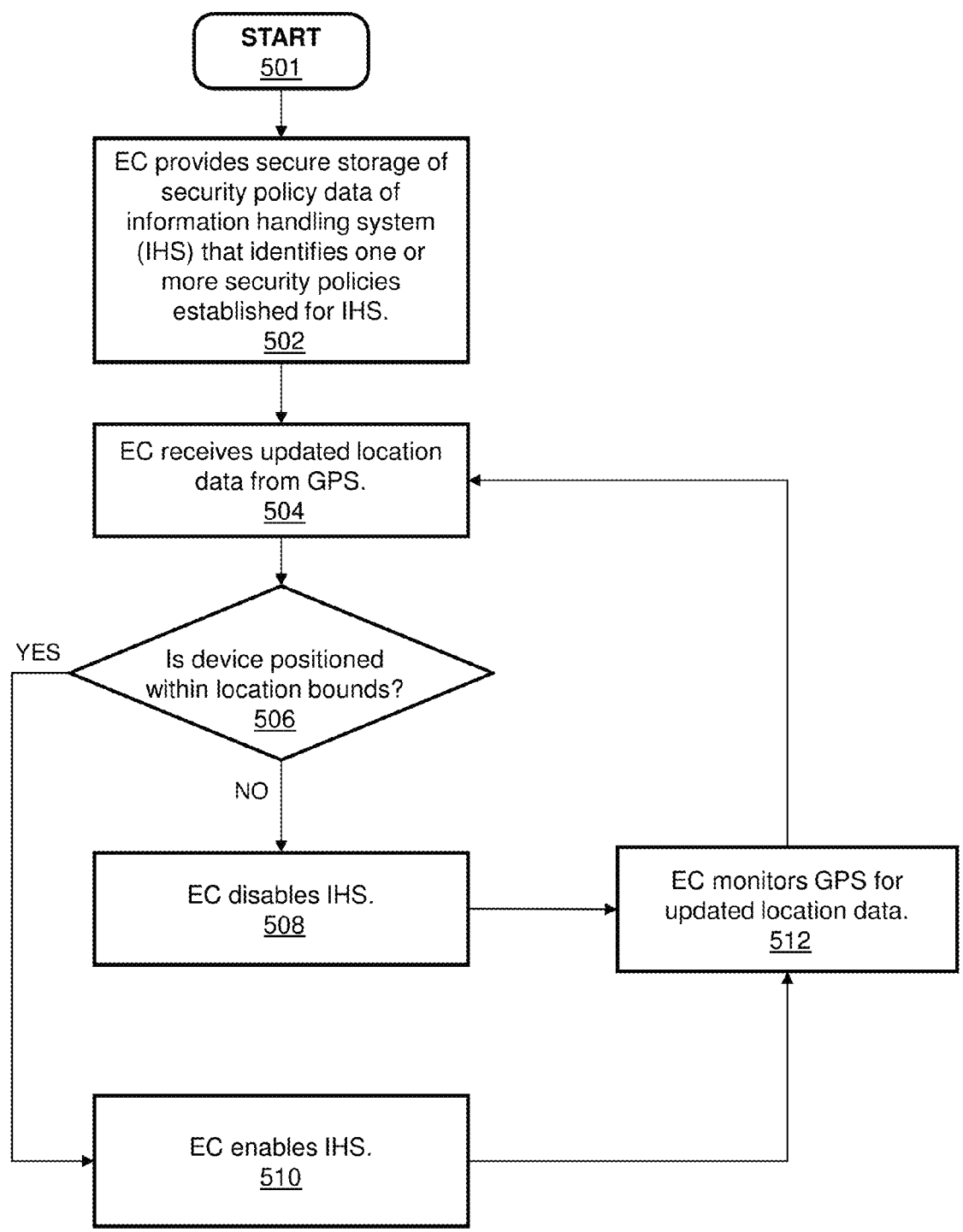
FIG. 5 is a flow chart illustrating a method for providing policy enforcement associated with system activation using secure policy data and corresponding GPS location data, in accordance with one or more embodiments.

FIG. 4 and FIG. 5 present flowcharts illustrating example methods by which IHS 100 and specifically EC 114 presented within the preceding figures performs different aspects of the processes that enable one or more embodiments of the disclosure. Generally, method 400 and method 500 collectively represent methods for securely enforcing policies established for IHS 100. The description of each method is provided with general reference to the specific components illustrated within the preceding figures. Generally each method is described as being implemented via execution of SPE utility/firmware 224 within EC 114. It is, however, appreciated that certain aspects of the described methods may be implemented via other processing devices and/or execution of other code. In the discussion of FIG. 4 and FIG. 5, reference is also made to elements described in FIG. 1-FIG. 3.

FIG. 4 illustrates an example method for providing policy enforcement using secure policy data. Method 400 begins at the start block 401 and proceeds to block 402 where EC 114 securely stores security policy data 222 that identifies one or more security policies established for information handling system (IHS) 100. EC 114 detects an addition/update of (new) policy data by a user that is authenticated using digital signature verification (block 404). In one embodiment, EC 114 limits access to policy data within secure storage 220 to one of: (a) a restricted write operation access that limits a number of changes to specific policy data; (b) an initial manufacturing interface access that allows insertion of policy data during manufacturing of IHS 100; and (c) authenticated access requiring entry of a digital signature that is verified via an authorization verification process. EC 114 receives new sensor data (block 406). EC 114 determines whether the received sensor data fulfills any condition of the sensor policy (decision block 408). In particular, EC 114 checks the received sensor data against security policy data from table 300 to determine whether the received sensor data indicates that IHS 100 fulfills one or more trigger conditions of an established security policy. If the received sensor data does not fulfill any condition of the sensor policy, EC 114 continues to monitor sensors for new sensor data (block 410). However, if the received sensor data fulfills any condition of the sensor policy, EC 114 performs a security measure that is associated with at least one condition of one or more established security policies being satisfied (block 412). In one embodiment, EC 114 performs the security measure by providing control signals including at least one of a reset signal, an enable signal and a disable signal to trigger a corresponding hardware state of an integrated functional device. The process ends at block 414.

FIG. 5 illustrates an example method for providing policy enforcement associated with system activation using secure policy data and corresponding GPS location data. Method 500 begins at the start block 501 and proceeds to block 502 where EC 114 provides secure storage of security policy data 222 that identifies one or more security policies established for information handling system (IHS) 100. In one embodiment, EC 114 limits access to policy data within secure storage 220 to one of: (a) a restricted write operation access that limits a number of changes to specific policy data; (b) an initial manufacturing interface access that allows insertion of policy data during manufacturing of IHS 100; and (c) authenticated access requiring entry of a digital signature that is verified via an authorization verification process. For example, a manufacturer may utilize the initial manufacturing interface access to establish for IHS 100 a policy that specifies that system operation is enabled only within location bounds of a customer's premise, which policy can be established according to a user request. In addition, EC 114 enables a user that is authenticated using digital signature verification to update policy data with specific data values for location bounds. The user modifies and/or provides additional information in order to update the policy data. The updated policy data defines a current or updated security policy. The updated security policy is stored in table 300 for subsequent access. EC 114 receives updated location data from GPS 206 (block 504). EC 114 determines whether IHS 100 is located within the location bounds using the updated location data (block 506). In particular, EC 114 checks the updated location data against security policy data from table 300 to determine whether the updated location data indicates that IHS 100 is located within the pre-specified location bounds. If the updated location data indicates that IHS 100 is not located within the location bounds provided by the user, EC 114 disables IHS 100 by sending a disable control signal to a system control port of IHS 100 (block 508). If the updated location data indicates that IHS 100 is located within the location bounds provided by the user, EC 114 enables IHS 100 for a next operating state if a current operation of IHS 100 is disabled (block 510). Alternatively, EC 114 does not interfere with and thus allows continued operation of IHS 100 if the current operation is enabled (block 510). In particular, EC 114 enables IHS 100 by sending an enable control signal to a system control port of IHS 100. EC 114 continues to monitor GPS 206 for specific changes to location data received from GPS 206 (block 512).

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
   at least one integrated functional device that can be disabled, the integrated functional device being a physical device; and
   an embedded controller that operates in a privileged environment and is directly coupled to at least one sensor and to at least one control signal port of the at least one integrated device, and which:
   in response to receipt of one or more sensor data from the at least one sensor, compares the received one or more sensor data to established securely-stored, security policies; and
   in response to the received one or more sensor data indicating that a trigger condition of one or more established security policies is satisfied, performs a security measure that corresponds to the trigger condition of the one or more established security policies being satisfied.

2. The information handling system of claim 1, further comprising at least one memory, wherein:
   the embedded controller is isolated from the at least one memory and other hardware components of the information handling system;
   the direct coupling of the embedded controller to the at least one sensor enables the embedded controller to receive an unalterable stream of input data; and
   the embedded controller comprises: a secure storage in which is stored policy data corresponding to a security policy that is enforceable based on information received from the at least one sensor.

3. The information handling system of claim 1, wherein the embedded controller:
   associates at least one trigger event with pre-defined response actions corresponding to a specific policy provided by said stored security policy data;
   detects an occurrence of the at least one trigger event; and
   in response to detecting the occurrence of the at least one trigger event, sends a control signal to a control signal port of a corresponding integrated device to provide an associated response action corresponding to the specific policy.

4. The information handling system of claim 1, wherein:
   the security measure includes one of enable, disable, and reset of one or more of the at least one integrated device; and
   the embedded controller performs the security measure by asserting a specific one of an enable signal, a disable signal and a reset signal of one or more of the at least one integrated device.

5. The information handling system of claim 1, wherein the embedded controller provides secure storage for policy data, which comprises at least one of: (a) first policy data obtained during a manufacturing process to provide factory specifications; and (b) second policy data that is customizable by a user.

6. The information handling system of claim 1, wherein the embedded controller limits access to policy data within the secure storage to a restricted write operation access that limits a number of changes to specific policy data.

7. The information handling system of claim 1, wherein the embedded controller limits access to policy data within the secure storage to an initial manufacturing interface access that allows insertion of policy data during manufacturing of the IHS.

8. The information handling system of claim 1, wherein the embedded controller limits access to policy data within the secure storage to authenticated access requiring entry of a digital signature that is verified via an authorization verification process.

9. The information handling system of claim 1, wherein the embedded controller:
   provides control signals including at least one of a reset signal, an enable signal and a disable signal to trigger a corresponding hardware state of an integrated functional device.

10. The information handling system of claim 1, wherein the embedded controller:
controls a hardware state of the at least one integrated functional device by using a direct connection to the at least one integrated functional device.

11. The information handling system of claim 1, wherein the embedded controller:
periodically receives location data from a location sensor from among a global positioning system (GPS) and a wireless triangulation system; and
allows continued operation of the IHS only while the received location data indicates that the IHS is located within specified location bounds, and otherwise disables the IHS.

12. A method for providing security policy enforcement using an embedded controller within an information handling system (IHS), the method comprising:
in response to receipt of one or more sensor data from at least one sensor, comparing the received one or more sensor data to established securely-stored security policies, the security policies associated with at least one integrated functional device that can be disabled, the integrated functional device being a physical device that is directly coupled to the embedded controller that operates in a privileged environment and is directly coupled to the at least one sensor and to at least one control signal port of the at least one integrated device; and
in response to the received one or more sensor data indicating that a trigger condition of one or more of the established security policies is satisfied, performing a security measure that corresponds to the trigger condition of the one or more established security policies being satisfied.

13. The method of claim 12, wherein: the embedded controller is isolated from a memory and other hardware components of the information handling system; the direct coupling of the embedded controller to the at least one sensor enables the embedded controller to receive an unalterable stream of input data and the embedded controller comprises: a secure storage in which is stored policy data corresponding to a security policy that is enforceable based on information received from the at least one sensor.

14. The method of claim 12, further comprising:
associating at least one trigger event with pre-defined response actions corresponding to a specific policy provided by said stored security policy data;
detecting an occurrence of the at least one trigger event; and
in response to detecting the occurrence of the at least one trigger event, sending a control signal to a control signal port of a corresponding integrated device to provide an associated response action corresponding to the specific policy.

15. The method of claim 12, wherein said performing the security measure further comprises:
asserting a specific one of an enable signal, a disable signal and a reset signal of one or more of the at least one integrated device.

16. The method of claim 12, further comprising:
providing secure storage for policy data, which data comprises at least one of: (a) first policy data obtained during a manufacturing process to provide factory specifications; and (b) second policy data that is customizable by a user.

17. The method of claim 16, further comprising limiting access to policy data within the secure storage to a restricted write operation access that limits a number of changes to specific policy data.

18. The method of claim 16, further comprising limiting access to policy data within the secured storage to an initial manufacturing interface access that allows insertion of policy data during manufacturing of the IHS.

19. The method of claim 16, further comprising limiting access to policy data within the secured storage to authenticated access requiring entry of a digital signature that is verified via an authorization verification process.

20. The method of claim 12, wherein:
said performing further comprises providing control signals including at least one of a reset signal, an enable signal and a disable signal to trigger a corresponding hardware state of an integrated functional device; and
the embedded controller controls a hardware state of the at least one integrated functional device by using a direct connection to the at least one integrated functional device.

* * * * *